United States Patent [19]

Di Noia et al.

[11] Patent Number: 4,524,624
[45] Date of Patent: Jun. 25, 1985

[54] PRESSURE AND DIFFERENTIAL PRESSURE DETECTORS AND TRANSMITTER FOR USE IN HOSTILE ENVIRONMENT

[75] Inventors: Emanuel J. Di Noia, Greenwich; Theodore R. Breunich, Stamford, both of Conn.

[73] Assignee: Peerless Nuclear Corporation, Stamford, Conn.

[21] Appl. No.: 436,274

[22] Filed: Oct. 25, 1982

[51] Int. Cl.³ .......................... G01L 9/10; G01L 19/04
[52] U.S. Cl. ........................................... 73/708; 73/722
[58] Field of Search .................... 73/708, 722, 728; 336/30, 136

[56] References Cited

U.S. PATENT DOCUMENTS

| | | | |
|---|---|---|---|
| 2,627,183 | 2/1953 | Greenwood, Jr. | 336/30 X |
| 3,099,823 | 7/1963 | Bobula | 73/728 X |
| 3,200,041 | 4/1965 | Ralfe et al. | |
| 3,308,411 | 3/1967 | Roshala | 73/722 X |
| 3,514,115 | 10/1967 | Gallo | |
| 3,560,741 | 2/1971 | Strindehag | |
| 3,578,564 | 5/1971 | Fletcher, III | |
| 3,762,993 | 10/1973 | Jones | |
| 3,853,702 | 12/1974 | Bevilacqua et al. | |
| 4,012,282 | 3/1977 | Hutter et al. | |
| 4,142,937 | 3/1979 | Eyral et al. | |
| 4,175,443 | 11/1979 | Schneider | 336/30 X |
| 4,243,484 | 1/1981 | Tsuji et al. | |
| 4,355,537 | 10/1982 | vander Have | 73/708 |

Primary Examiner—Donald O. Woodiel
Attorney, Agent, or Firm—Lee C. Robinson, Jr.

[57] ABSTRACT

A pressure or differential pressure detector is hardened to be suitable for use in a hostile environment, for example, under high pressure, temperature, and radiation conditions which could possibly be present in the containment vessel of a nuclear generating plant. A linear variable differential transformer (LVDT) disposed within a detector housing is designed to sustain temperatures up to or exceeding 500° F. A signal detecting and conditioning circuit disposed remote from the detector housing includes demodulator means for producing X and Y demodulated signals respectively from A and B secondary windings of the LVDT, a summing circuit for producing a temperature analog voltage X+Y, a subtractor for providing a differential pressure analog voltage X−Y, and a multiplier for multiplying the differential pressure analog voltage X−Y by a temperature compensation voltage X+Y-Ref based on the temperature analog voltage to provide a resulting temperature-compensated differential pressure analog signal.

11 Claims, 11 Drawing Figures

PRESSURE AND DIFFERENTIAL PRESSURE DETECTORS AND TRANSMITTER FOR USE IN HOSTILE ENVIRONMENT

BACKGROUND OF THE INVENTION

This invention relates to pressure and differential pressure detectors and transmitters, and is particularly directed to pressure and differential pressure detectors suitable for use within the containment vessel of a nuclear power plant, in which, under catastrophic plant conditions, the detector could be exposed to temperatures up to 500° F. and external pressures of up to 500 psig.

Pressure and differential pressure transmitters are currently employed in nuclear power plants to provide a remote indication of critical pressure or pressure differentials, for example, pressure differences in the primary fluid within the nuclear reactor loops or between the inlet and outlet headers of a nuclear steam generator. These measurements are used to monitor the performance of the nuclear power plant, and the reliable and accurate operation of such detector is necessary to ensure safe operations management of the nuclear power plant.

These pressure detectors normally employ a housing in which a pressure bellows is disposed, with pressure ports provided to permit fluid communication between the inside and outside of the pressure bellows. A shaft connected to the pressure bellows then displaces the movable core of a linear variable differential transformer (LVDT) which is also disposed within the detector housing. An AC signal is provided to the primary winding of this differential transformer, and the displacement of the core affects the relative strength of signals derived from A and B secondary windings of this differential transformer. The relative strengths of these signals indicate the differential pressure measured by the pressure detector.

However, such previous pressure and differential pressure detectors and transmitters have not been suitably hardened to withstand external pressures far in excess of normal ambient pressures, nor have these detectors been designed to withstand the temperature of impinging live steam. In addition, such previous pressure detectors have not been provided with any means to compensate for signal drift caused by changes in temperature of the LVDT, and, consequently, such detectors and transmitters have not been able to provide accurate measurements of pressure over wide ranges of environmental temperatures.

OBJECTS AND SUMMARY OF THE INVENTION

Accordingly, it is an object of this invention to provide a pressure and differential pressure detector, which can be either a simple pressure detector or a differential pressure detector, and which is hardened to withstand temperatures of 400° to 500° F. for several hours without detriment to its signal accuracy.

It is another object of this invention to provide pressure and differential pressure detectors which are suitable for continued use under catastrophic conditions, such as loss of coolant in a nuclear reactor fluid loop or steam generator or a break in a main steam line.

It is a further object of this invention to provide such a pressure and differential pressure detector which is hardened to heat and radiation, and which will perform accurately at elevated environmental pressures and temperatures.

It is still another object of this invention to provide a pressure or differential pressure detector in which electronic circuitry is provided for automatically carrying out temperature compensation of a pressure or differential pressure analog signal, so that such signal maintains its accuracy throughout a wide range of environmental pressures and temperatures.

It is a further object of this invention to provide such a detector suitable for withstanding internal hydrostatic pressures of up to 4000 psig without adverse effect on its operating characteristics.

According to a favorable embodiment of this invention, a pressure or differential pressure detector is provided for sensing pressure of a fluid, and is designed for use in a hostile environment in which the temperature and pressure can vary up to or in excess of 500° F. and 500 psig, respectively. The detector of this invention has a housing formed of material suitable for withstanding the conditions of this hostile environment. Thus, the detector housing is favorably formed of stainless steel carbon steel or Inconel, and can be completely seal-welded to preclude leakage of contaminated reactor fluids. The electrical housing is provided with O-ring seals at all exposed surfaces, and a high environmental connector is used for electrically connecting the detector with a cable to a remote electronics cabinet or transmitter. A linear variable differential transformer (LVDT) and a pressure bellows are disposed within the pressure containment housing.

Special materials are used in the critical components of the detector, such as the differential transformer, to harden the same for high temperature and radiation conditions.

A remote electronics cabinet or transmitter, which can be favorably disposed outside the nuclear reactor containment vessel, includes an AC signal supply for providing a 400 Hz signal to the primary winding of the differential transformer, and a signal detecting and conditioning circuit for providing an output pressure analog signal in response to X and Y signals received from the A and B secondary windings, respectively, of the differential transformer.

This signal detecting and conditioning circuit includes demodulators, favorably formed of operational amplifiers connected to provide temperature compensation for demodulating the X and Y demodulated signals. An adding circuit produces a sum signal from the X and Y demodulated signals as a temperature analog signal, and a subtracting circuit produces a difference signal from the X and Y demodulated signals as a pressure analog signal. A temperature compensation signal is derived in another subtracting circuit by taking the difference between the sum signal level and a reference signal level, and a multiplying circuit multiplies the pressure analog difference signal by the temperature compensating difference signal to produce a temperature-compensated pressure signal, or differential pressure signal based on the temperature analog signal and the pressure analog signal.

Many further objects, features, and advantages of this invention will become more fully apparent from the ensuing detailed description of a preferred embodiment, when considered in connection with the accompanying drawings.

DETAILED DESCRIPTION OF A PREFERRED EMBODIMENT

Figure 1:
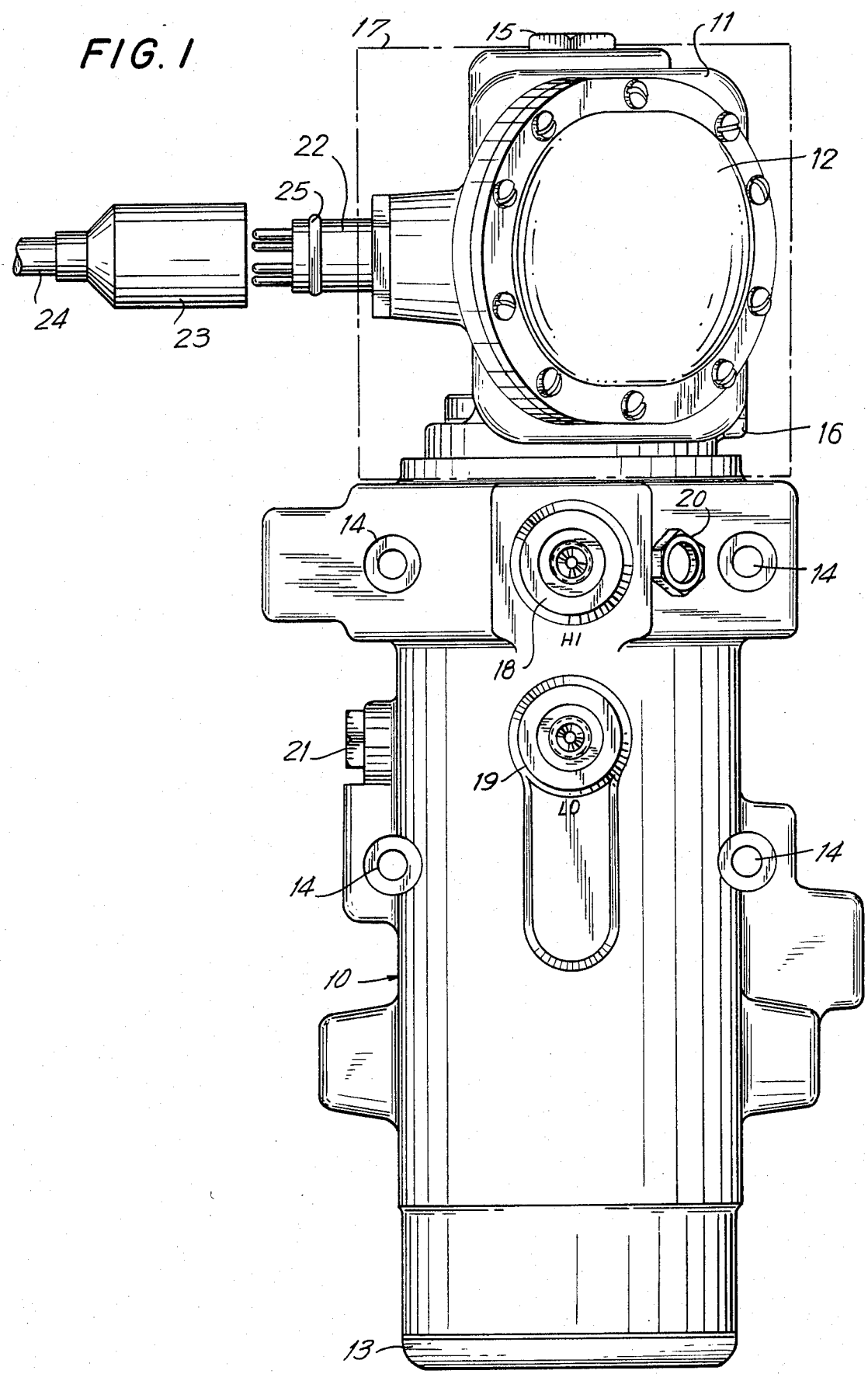
FIGS. 1 and 2 are front and side elevations of a pressure or differential pressure detector of this invention.
Figure 2:
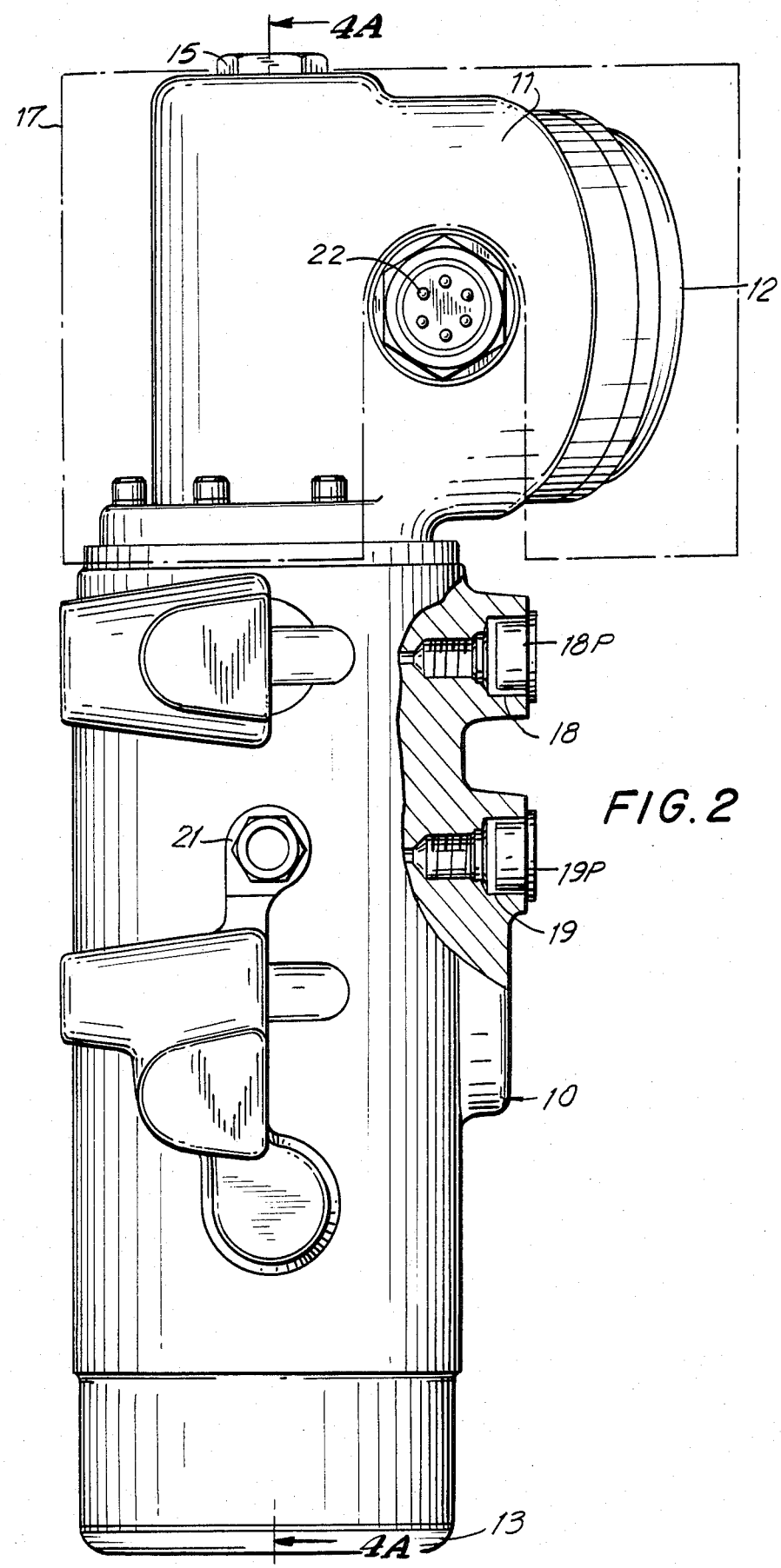
Figure 3:
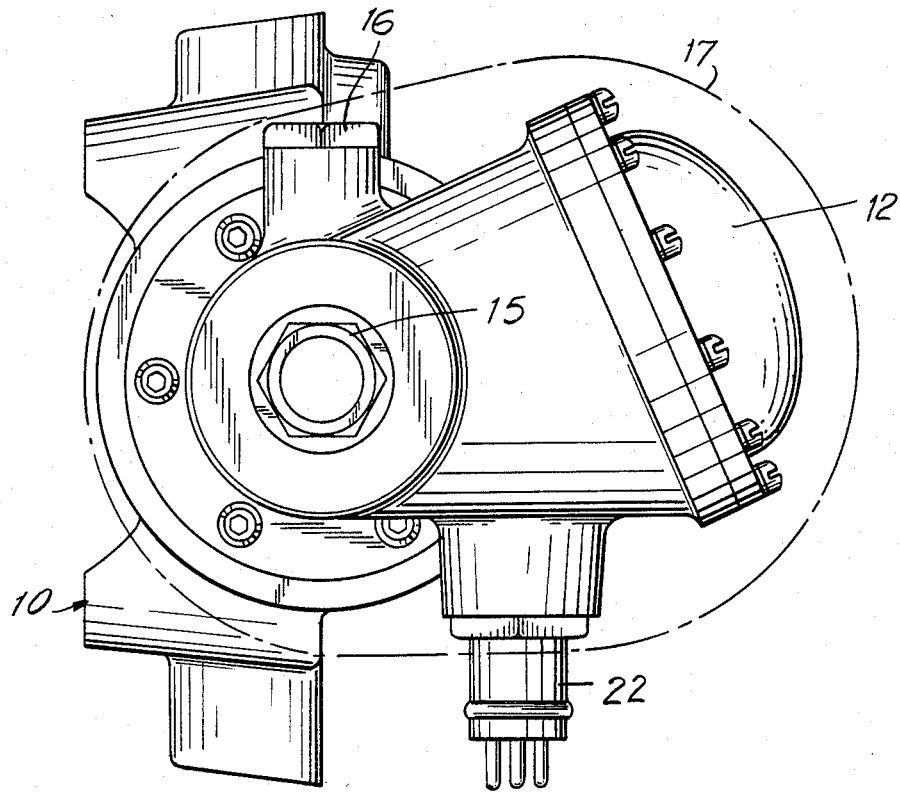
FIG. 3 is a top view of the pressure or differential pressure detector of this invention.

With reference to the drawings, and initially to FIGS. 1-3 thereof, an illustrative embodiment of a detector has a generally cylindrical main housing 10 and an electrical housing 11 disposed atop it. A convex cover 12 for the electrical housing is fastened thereto by a ring of machine screws. A canopy seal ring 13 is disposed at the bottom of the main housing 10, and through-bores 14 are provided on the main housing 10 for mounting or fastening the detector in place within the containment vessel of a nuclear reactor plant or within the steam generator plant.

An upper adjusting plug 15 and a lower adjusting plug 16 removably seated respective adjustment ports can be removed therefrom to adjust the positioning of a linear variable differential transformer disposed within the electrical housing 11.

A shroud 17 of sheet stainless steel encloses the electrical housing 11 and is separated from the surface thereof to shield the same from direct contact with live steam in the event, for example, of a main steam line rupture. Stainless steel is preferred for its low thermal conductivity, so that the inside surface thereof remains relatively cool if the outer surface is exposed to a blast of live steam.

Upper and lower ports 18 and 19 extend through the wall of the main housing 10, and provide fluid communication with two points at which differential pressure is to be measured. One such port is provided for pressure detectors. For example, fluid level, pump differential pressures, fluid flow measurement and loop system pressures, etc., can be measured. Preferably, these ports 18 and 19 are designed to satisfy weldment of connecting piping.

Shipping plugs 18P and 19P are placed in these ports 18 and 19 for shipping and storage, but are removed prior to connection of the detector.

Also shown are an upper vent 20 and a lower vent 21, each with a vent plug seated therein.

A six-pin male connector 22 is shown extending from the side of the electrical housing 11, and its associated female six-pin connector 23 is also shown with a power and signal cable 24 extending therefrom. These connectors 22 and 23 utilize a double O-ring seal to achieve a high resistance to temperature and pressure. Here, an O-ring 25 is shown disposed on a sleeve of the male connector 22, and a similar O-ring (not shown) is further disposed within the female connector 23.

The main detector housing 10 are preferably formed of stainless steel, carbon steel, or Inconel material, and the main housing 10 is designed to withstand internal hydrostatic pressures of 4000 psig.

Figure 4A:
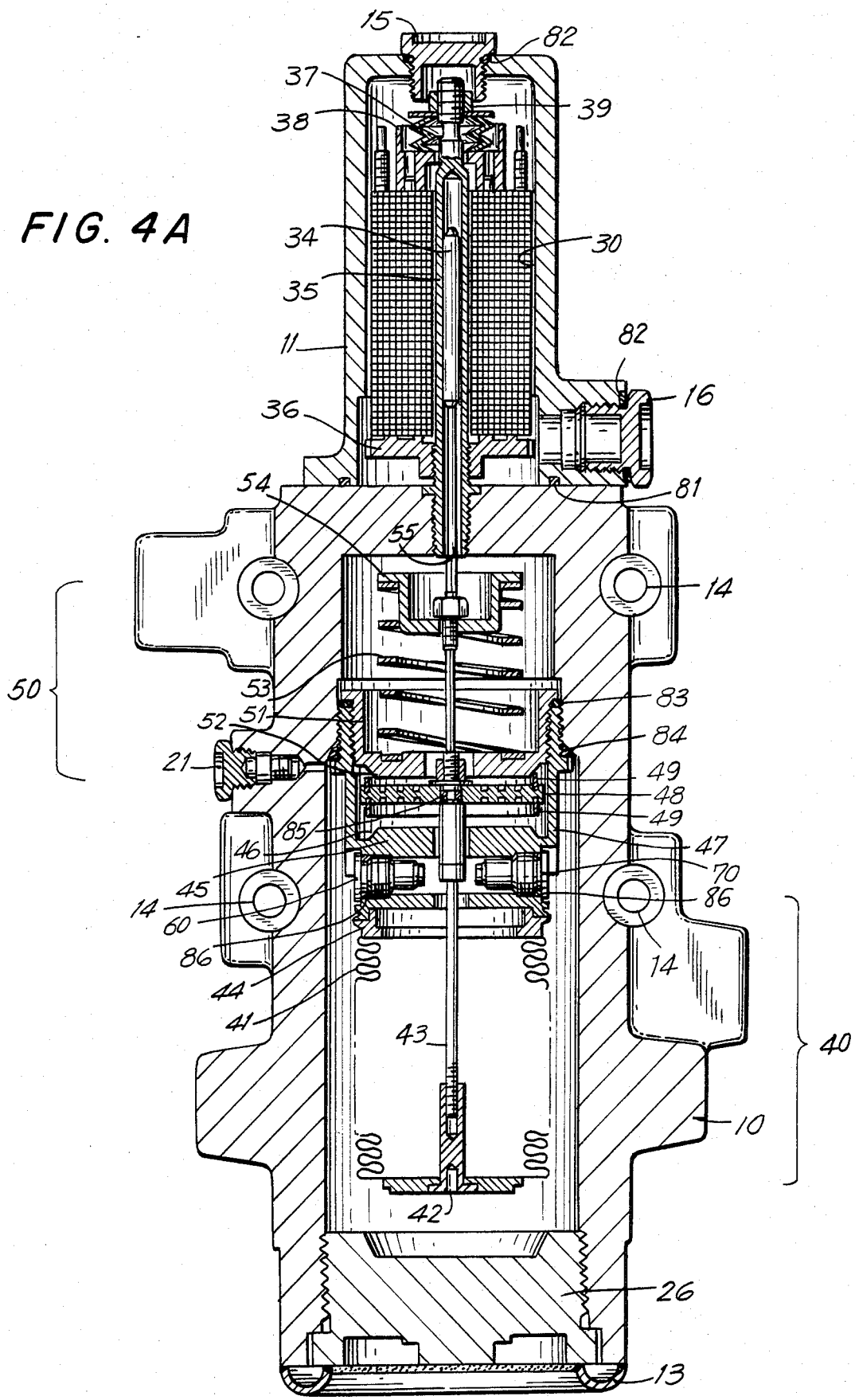
FIG. 4A is a cross-sectional elevation of the pressure or differential pressure detector of this invention.

As further shown in FIG. 4A, a fitting 26 is disposed at the bottom of the main housing 10, and the canopy seal 13 is welded to the housing 10 and also to the fitting 26 thereby completely sealing the pressure containment chamber of the housing 10 to prevent any leakage of contaminated reactor fluids. However, if the detector is to be located on the secondary fluid side, the canopy seal 13 can be omitted, and the fitting 26 can remain unwelded to provide ready access for servicing the inside of the detector housing 10.

Figure 6:
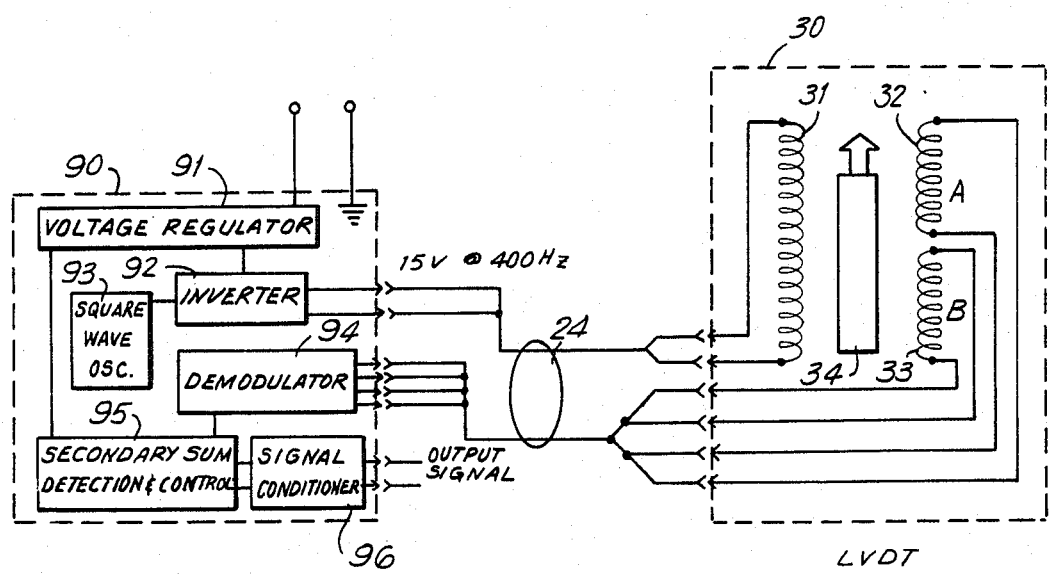
FIG. 6 is a block schematic diagram of linear variable differential transformer coupled to a temperature-compensating detector circuit according to this invention.

Within the electrical housing 11 is disposed a linear variable differential transformer (LVDT) 30 including a primary winding 31, an A secondary winding 32, and a B secondary winding 33, shown schematically in FIG. 6.

The LVDT 30 also has an axially movable core 34 disposed within a hollow core guide 35 by which the LVDT 30 is attached to the main housing 10. An adjusting wheel 36 is threadably attached to the core guide 35 and supports the LVDT 30. Adjustment of this wheel 36 permits axial movement of the LVDT 30.

A Bellville spring 37 biases a guide and shroud 38 which presses against the LVDT 30. A washer and adjusting nut 39 threadably coupled to the core guide 35 permit adjustment of the tension of the Bellville spring 37.

A bellows assembly 40 is disposed within the main housing 10. This assembly 40 includes a longitudinal, generally cylindrical bellows 41 with an end cap 42 at the bottom thereof connected to a shaft 43 extending axially through the bellows to move as the bellows 41 expands and contracts with response to changes in fluid pressure between the outside and inside thereof. The end of the bellows 41 remote from the end cap 42 is connected by means of a cuff 44 to a bellows base 45. The base 45 has a central axial passageway permitting movement of the shaft 43 and also permitting fluid communication to the inside of the bellows 41.

The base 45 has an upper frustroconical sealing surface 46 and a cylindrical member 47 which is mated to the inner surface of the housing 10.

An overpressure seal moulding 48, in the form of a disk having annular upstanding sealing ribs 49 on either circular surface thereof, is fastened to the shaft 43.

A spring bias mechanism 50 is disposed atop the bellows assembly 40 within the main housing 10, and includes a lower spring cage 51 fitted within the cylindrical member 47 and having a lower frustroconical sealing surface 52 facing the upper overpressure seal rib 49 of the seal moulding 48. The spring bias mechanism 50 includes a helical coil spring 53. Preferably this spring has closed ends and is formed as a helical coil member of square cross section, rather than of round cross-sectional spring wire. This spring can be made by machining a helical slot into a tube of spring metal. The spring 53 so formed can then have its thickness reduced by machining the outer cylindrical surface thereof to change its spring constant to match the characteristics of the bellows assembly 40.

An upper spring cage 54 couples the spring 53 to the shaft 43 and an upper stem 55 then connects the shaft 43 from this point to the movable core 34 of the LVDT 30.

In order to ensure that the LVDT 30 is hardened against high temperature and radiation conditions, type ML magnet wire having a 220° C. continuous surface characteristic with polyamide insulation is preferred for the primary and secondary windings 31-33. Also, these windings are preferably wound upon a bobbin of type 316 stainless steel, rather than upon an epoxy core, the latter being the industry standard. A high temperature, high radiation resistant potting compound is also preferred, for example, Stycast 2762-FT epoxy. The lead wires for the LVDT are preferably insulated with Capton polyamide insulation and the LVDT 30 is preferably encased in low-carbon steel plated with hard chrome. The LVDT core 34 is preferably formed of Carpenter 49 magnetic material, also plated with hard chrome.

Figure 5A:
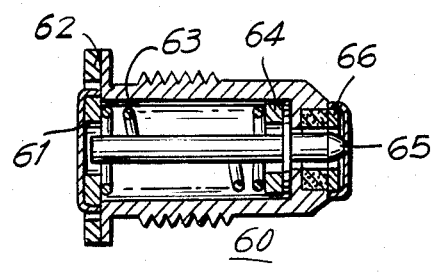
FIGS. 5A and 5B show relief valve assemblies for use in the differential pressure detector of this invention.
Figure 5B:
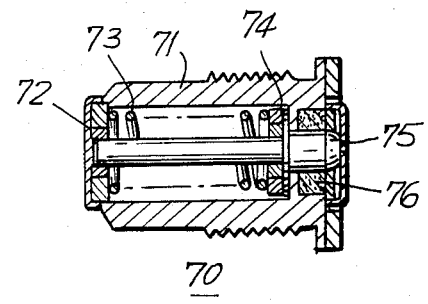

Overpressure relief valve assemblies 60 and 70, respectively described in greater detail with reference to FIGS. 5A and 5B, are disposed in respective sockets in the bellows base 45 to provide pressure relief for momentary sudden over-range pressure changes which may be applied in either pressure chamber. However, the arrangement including the upper sealing surface 46, the moulding 48, the sealing ribs 49, and the lower sealing surface 52 also acts to positively limit the differential pressure to which the bellows 41 is exposed to a predetermined maximum from either pressure signal source.

In this embodiment, the lower spring cage 52 defines an upper chamber in the housing 10 connected to the upper port 18, while the bellows base 45, bellows 41, and end cap 42 define a chamber within the lower portion of the housing 10 which is in fluid communication with the lower port 19. Thus, the upper port 18 is in fluid communication with the inner surface of the bellows 41, and the lower port 19 is in fluid communication with the outer surface of the bellows 41. The bellows base 45 and the lower spring cage 51 together define a communication chamber in which the seal moulding 48 is disposed, and there is normally fluid communication from the upper port 18 through the spring cage 51, the communications chamber, and the bellows base 45 to the inside of the longitudinal bellows 41. However, axial displacement of the bellows 41 and its associated shaft 43 above or below a predetermined limit will bring the upstanding ribs 49 into contact with either the frustroconical sealing surface 52 or the frustroconical sealing surface 46, thereby cutting off fluid communication to the inside of the bellows 41. Consequently, the bellows assembly 40 is shielded from pressure differentials above its predetermined maximum. When the pressure differential returns to within the predetermined range, the seal moulding 48 returns to an intemediate position away from the surfaces 46 and 52, and normal operation once again begins.

Figure 4B:
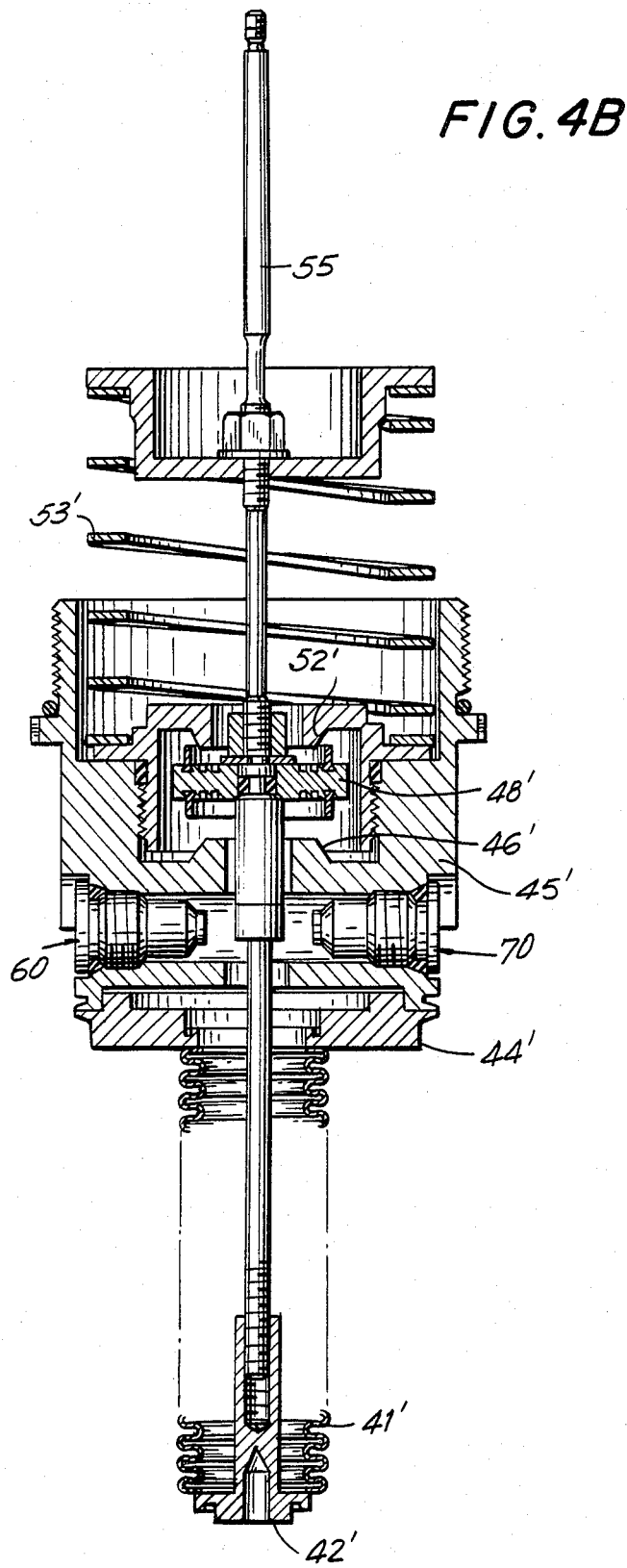
FIGS. 4B and 4C show a portion of the pressure or differential pressure detector according to alternative embodiments.
Figure 4C:
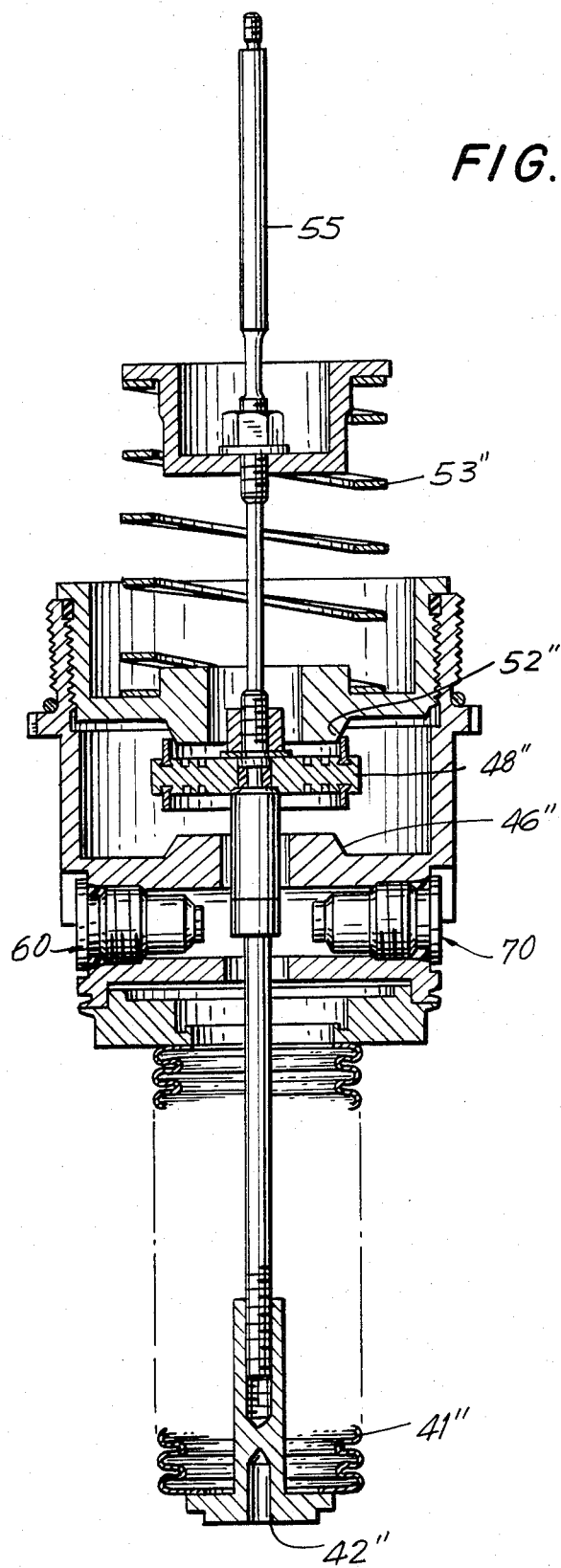

FIGS. 4B and 4C respectively illustrate a high pressure bellows and spring arrangement and an intermediate pressure bellows and spring arrangement. In FIG. 4B, elements corresponding to similar elements in FIG. 4A are identified with the same reference numbers, but primed, and a detailed description thereof is omitted. Similarly, in FIG. 4C, elements similar to those shown in FIG. 4A are identified with the same reference numbers, but double primed.

In the high pressure arrangment of FIG. 4B, the bellows 41', end cap 42', cuff 44', and base 45' have their radial dimension reduced somewhat with respect to the similar elements of FIG. 4A in order to respond to higher pressures and a higher range of pressure differentials. Similarly, the sealing arrangement including the frustroconical surfaces 46' and 53' and the seal moulding 48' and corresponding upstanding ribs 49' are dimensioned to correspond with the lesser diameter of the bellows 41'.

In the intermediate pressure bellows and spring arrangement of FIG. 4C, the bellows 41", end cap 42", cuff 44", and base 45" are dimensioned to have a radius intermediate that of the similar arrangements of FIGS. 4A and 4B.

Also, similar to the previously described arrangements of FIGS. 4A and 4B, the arrangment of FIG. 4C has its frustroconical surfaces 46" and 52" and its seal moulding 48" dimensioned to have a diameter corresponding to that of the associated bellows 41".

Also in these arrangements, the springs 53, 53', and 53" are dimensioned to have an appropriate spring constant corresponding to the desired differential pressures.

The remaining elements of the arrangements of FIGS. 4A, 4B, and 4C are substantially identical. This allows the interchangeability of the bellows assemblies 40, 40', and 40" depending upon whether low pressures, high pressures, or intermediate pressures are to be monitored.

Details of the overpressure relief valve assemblies 60 and 70 are shown in FIGS. 5A and 5B, respectively.

The overpressure relief valve assembly 60 is formed of a housing 61 having a spring seat 62 at one end thereof holding a spring 63 within the housing 61. Another spring 64 is disposed at the end of the housing 61 distant from the first seat 62. A relief valve piston 65 is affixed to the spring seat 64, and mates with an end closure 66.

In similar fashion, the overpressure relief valve assembly 70 has a housing 71, a spring seat 72, a spring 73, another spring seat 74 affixed to a piston 75, and an end closure 76.

These overpressure relief valve assemblies 60 and 70 are intended to open when the differential pressure between the inside and outside of the bellows suddenly exceeds the predetermined range of the detector. That is, the sealing arrangement formed of the frustroconical surfaces 46 and 52 and the seal moulding 48 cannot shut off the fluid communication to the inside of the bellows 41 sufficiently quickly.

O-ring seals are included at various positions where components are coupled to one another to ensure a good seal therebetween. These O-ring seals are preferably formed of EPT rubber for high temperature, high radiation service. This material is satisfactory for use to temperatures of 320° F. for extended times, and for limited times up to 500° F. If higher temperatures, but relatively lower radiation levels are likely to be encountered, silicone rubber O-rings can be used instead.

These O-ring seals can be disposed at least at the following points. One O-ring 81 is seated between the main housing 10 and the electrical housing 11. Further O-rings 82 seat the adjusting plugs 15 and 16. Another O-ring 83 seals the lower spring cage to the outer bellows base 47 while still another O-ring 84 seals the outer cylindrical member 47 of the bellows base 45 to the main housing 10. An O-ring 85 seals the junction the seal moulding 48 and the bellows shaft 43 at its mounting thereto, while further O-rings 86 seat the relief valve assemblies 60 and 70.

An electronics cabinet containing the transmitter electronics is situated remote from the housing 10 and includes circuitry for supplying an AC signal to the primary winding 31 of the LVDT 30, and also contains signal supply and processing circuitry for deriving pressure or differential information from signals received from the A secondary winding 32 and the B secondary winding 33.

As shown schematically in FIG. 6, an electronics module 90 comprises a voltage regulator supplying a constant voltage to an inverter 92 which is driven by a square wave oscillator 93 to supply a constant, regulated 15 volt, 400 Hz square wave signal to the two leads of the LVDT primary winding 31. The A and B secondary windings 32 and 33 provide X and Y signals, which are also 400 Hz AC signals, to a demodulator 94. The demodulator 94 is basically formed of two rectifiers or amplitude demodulators, for demodulation or conversion of the X and Y AC signals to more easily processed DC signals. The demodulator 94 serves only for rectification or conversion, and does not participate in the automatic temperature compensation of the X and Y signals. The relative strengths of these X and Y signals depends of the displacement of the core 34, and, consequently, the difference between the amplitudes of the X and Y signals can provide an indication of the pressure as measured by the bellows 41.

The demodulator 94 provides demodulated X and Y signals to a secondary sum detection and control circuit 95, whose operation will be discussed below, and this circuit 95 then provides a temperature compensated differential pressure analog signal. A signal conditioner 96 follows this circuit 95, and converts the output signal thereof to a form suitable for operating a meter, chart drive, or other indicator.

The temperature compensation operation is carried out generally as follows.

As mentioned above, the difference $X-Y$ between the demodulated X and Y signals is proportional to the displacement of the movable core 34, and is thus proportional to the pressure sensed by the pressure detector. However, the resistance of the A and B transformer secondaries 32 and 33 varies generally linearly with temperature. Accordingly, the sum $X+Y$ of the demodulated X and Y signals will be generally proportional to the temperature of the transformer A and B secondaries 32 and 33. In like manner, the difference signal $X-Y$ will vary with temperature and so be in error at elevated temperatures. By finding the difference between this sum $X+Y$ and a reference level Ref, which does not change with the temperature of the secondaries 32 and 33, and thus can correspond, for example, to a constant reference temperature of 75° F., an error signal can be derived whose level corresponds to the deviation of the sum signal $X+Y$ from the reference temperature. Accordingly, the secondary sum detection and control circuit 95 operates on the demodulated X and Y signals by multiplying the difference $X-Y$ by the temperature error signal to derive a temperature-compensated analog of the pressure sensed by the pressure detector. A multiplying factor is selected for the error signal to match the detector characteristics under elevated temperatures, and is adjusted to meet these characteristics by selected suitable values for a voltage divider resistor network, as described below.

Figure 7:
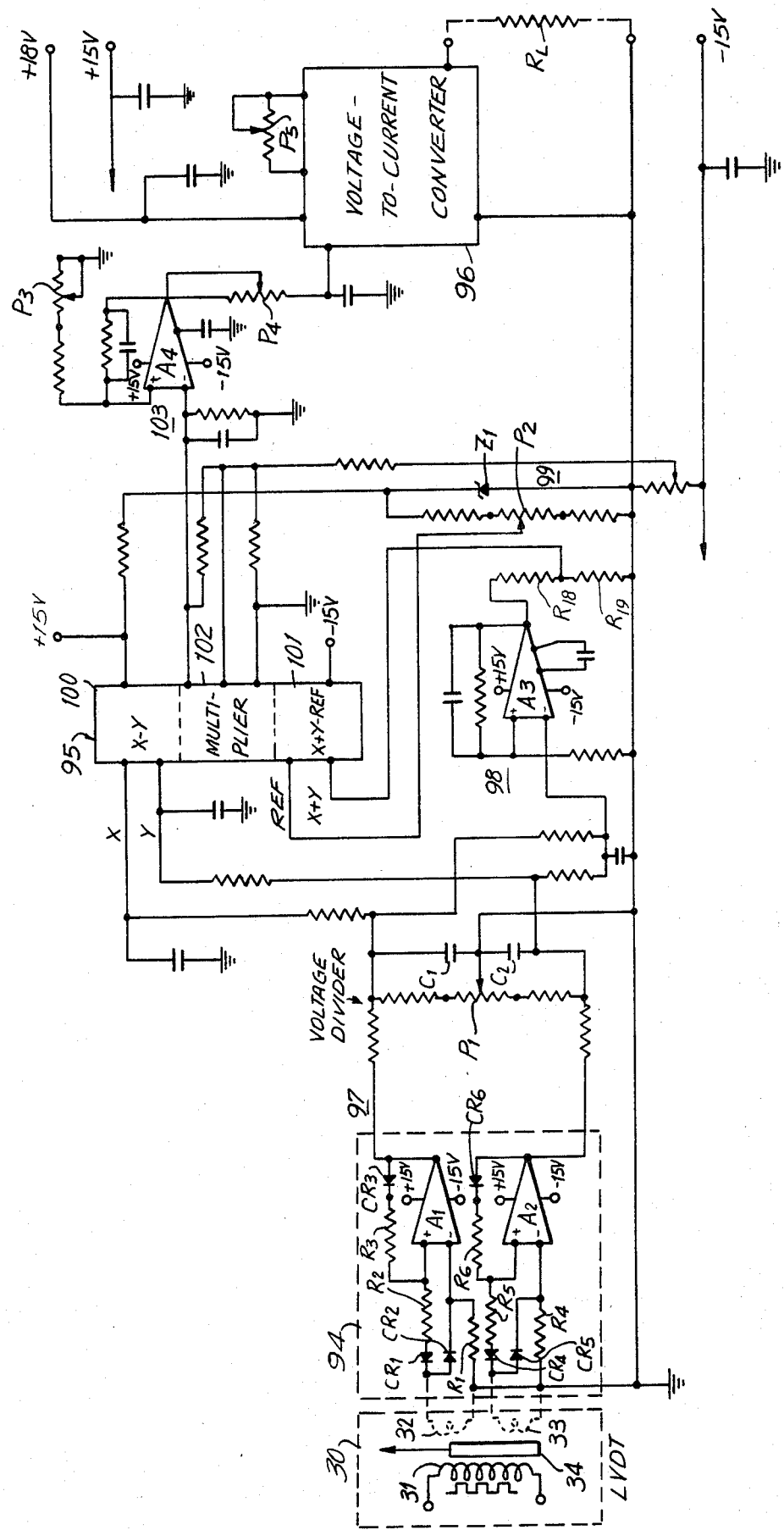
FIG. 7 is a detailed schematic diagram of a signal processing circuit according to this invention.

FIG. 7 shows the details of the demodulator 94 and the detection and control circuitry 95 according to one favorable embodiment of this invention.

In this embodiment, the demodulator 94 includes first and second operational amplifiers $A_1$ and $A_2$ each having first and second inputs and an output. First, second, and third resistors $R_1$, $R_2$, $R_3$, and $R_4$, $R_5$, $R_6$ and first, second, and third diodes $CR_1$, $CR_2$, $CR_3$, and $CR_4$, $CR_5$, $CR_6$ are associated with each of the operational amplifiers $A_1$ and $A_2$. The first resistor $R_1$, $R_4$ is connected between a first lead of a respective one of the A and B secondary windings 32 and 33 and the first input of the associated operational amplifier. The first and second diodes $CR_1$, $CR_2$ and $CR_4$, $CR_5$ are connected back-to-back at one end to the second lead of the associated secondary winding 32, 33 and at the other end through the second resistor $R_2$, $R_5$ to the second input of the operational amplifier $A_1$, $A_2$ and to the first input of the operational amplifier $A_1$, $A_2$, respectively. The third diode $CR_3$, $CR_6$ and a third resistor $R_3$, $R_6$ are coupled in series between the output and the second input of the associated operational amplifier $A_1$, $A_2$.

The demodulator 94 is connected as described hereinabove to provide temperature-stabilized X and Y demodulated signals, that is, any variations in temperature at the location of the electronics module 90 are automatically compensated. The outputs of the operational amplifiers $A_1$ and $A_2$ are provided to a voltage divider network 97 including smoothing capacitors $C_1$ and $C_2$, and a variable resistor $P_1$ whose slider is coupled to ground. This network 97 permits adjustment of the relative output levels of the operational amplifiers $A_1$ and $A_2$. An adder 98 formed of an operational amplifier $A_3$ provides the sum signal $X+Y$, which serves as a temperature analog. The output of the amplifier $A_3$ is fed through a voltage divider network formed of resistors $R_{18}$ and $R_{19}$ whose junction provides an adjusted version of the sum signal $X+Y$. The relative values of the resistors $R_{18}$ and $R_{19}$ are selected to control the percentage of the sum signal $X+Y$ entering the detection and control circuitry 95; hence the relative values of the resistors $R_{18}$ and $R_{19}$ determine the magnitude of the error signal and thus determine the correction of the difference signal $X-Y$ to achieve the desired temperature compensation. At the same time, a voltage reference source 99 including a variable resistor $P_2$ and a zener diode $Z_1$ provides, at the slider of the variable resistor $P_2$, the reference level Ref.

The secondary detection and control circuit 95 is here formed as an integrated circuit and can be considered to have a subtractor portion 100 receiving the demodulated X and Y signals to provide a difference signal $X-Y$, fed through the voltage divider resistors $R_{18}$ and $R_{19}$, another subtractor portion 101 to which the sum signal $X+Y$ and the reference level Ref are applied to generate the correction signal $X+Y-Ref$, and a multiplier portion 102 for multiplying the pressure analog $X-Y$ times the error signal to provide a temperature-compensated differential pressure analog.

This signal is then provided to a range amplifier 103 including an operational amplifier $A_4$, a sensitivity-control variable resistor $P_3$, and an output-level-adjustment variable resistor $P_4$. The adjusted temperature-compensated differential pressure analog is furnished therefrom to the signal conditioner 96, which, in this embodiment includes a voltage-to-current converter whose operating level is controlled by a variable resistor $P_5$ and whose output is applied across a load $R_L$.

Figure 8:
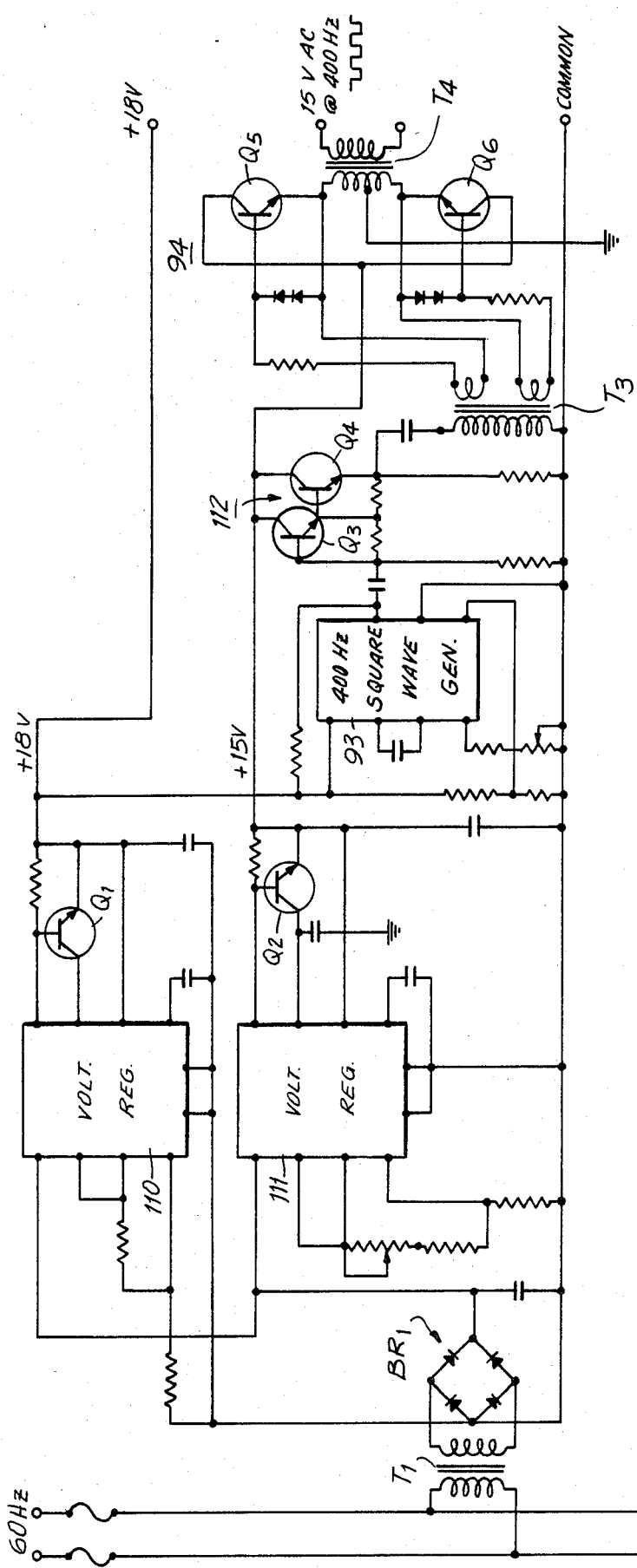
FIG. 8 is a schematic diagram of a power and signal supply circuit for use with the pressure or differential pressure detector of this invention.
Figure 8:
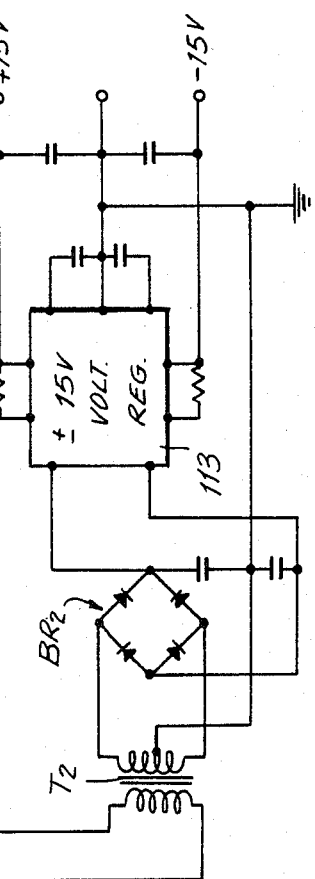

FIG. 8 shows the circuit details of a power supply and signal source module. Here, AC line power is provided through step-down transformers $T_1$ and $T_2$ to bridge rectifiers $BR_1$ and $BR_2$, respectively. The rectifier $BR_1$ is followed by an 18-volt voltage regulator 110 and a 15-volt voltage regulator 111, each of which is followed by an associated feed-through transistor $Q_1$ and $Q_2$.

The square wave oscillator 93 in this circuit is formed of a type 2209 integrated circuit powered through the 18-volt regulator 110. This oscillator 93 provides a 400 Hz square wave signal through a darlington arrangement 112 of isolation resistors $Q_3$ and $Q_4$ to the primary of an isolation transformer $T_3$ having twin secondaries. The inverter 94 includes a pair of drive transistors $Q_5$ and $Q_6$ each having its collector powered from the 15-volt regulator 111, its base driven by a respective secondary of the transformer $T_3$, and its emitter connected to one end of a center-tap primary of an output transformer $T_4$. The secondary of this transformer $T_4$ provides a 15 volt AC (i.e., 400 Hz) signal to the primary winding 31 of the LVDT 30.

The bridge rectifier $BR_2$ is followed by a ±15 volt DC voltage regulator to provide both positive and negative 15 volt levels to power the electronic devices shown in FIG. 7.

It should be appreciated from the foregoing discussion that the pressure or differential pressure detector embodying this invention can withstand catastrophic conditions, to which elements of a nuclear reactor electric generating plant can be subjected, without sustaining any significant damage. It is also apparent that the detector according to this invention will provide a pressure or differential pressure signal that is compensated to within an exceedingly narrow margin of error over a wide range of temperatures.

The detector of this invention has been tested and has been found to operate satisfactory under hostile environmental conditions while maintaining the integrity of its signal. The detector was tested by cycling many times over a range of 78° F. to 400° F. and included an aggregate cycle time of six hours at 500° F. These are periods far in excess of those over which a catastrophic event would endure. The differential pressure output was studied for stability over a period of several weeks. The tests indicated that excellent repetition was achieved, without instability or drift in the temperature-compensated pressure analog signal.

The following Table summarizes the test data. In this Table, the error magnitude noted is the largest value for the range, and represents a maximum, rather than an average value.

TABLE

| Temperature °F. | Output | Deviation as % of Full Scale Based on Room Values |
|---|---|---|
| 78 | 1.461 | N/A |
| 200 | 1.462 | .14% |
| 300 | 1.464 | .26% |
| 400 | 1.468 | .55% |

These test data indicate that the detector has a linearity of ½%. This represents excellent stability for the range of temperatures, especially considering that the data can be accurately repeated and that the signals are stable over a period of weeks.

Although the above embodiment is a differential pressure detector, the present invention also applies to a pressure detector for measuring the pressure at a single point, in which only the upper port 18 is connected.

Further, while the term "analog" has been used to describe the above signals, that term is intended to mean only that an electrical quantity represents another quantity, such as pressure or temperature. It is clear that this invention could also be practiced by using digital circuitry in place of the linear circuitry shown in FIGS. 6 and 7.

While an illustrative embodiment has been shown and described, many modifications and variations thereof will become apparent to those of ordinary skill in the art, without departure from the scope and spirit of this invention as defined in the appended claims.

What is claimed is:

1. A pressure detector for sensing the pressure of a fluid system, and suitable for use in a hostile environment in which the environmental temperature and pressure can vary up to 500° F. and 500 psig, comprising a housing formed of material suitable for withstanding conditions of said hostile environment; pressure transducer means disposed within said housing for converting said pressure into a corresponding longitudinal displacement; at least one port in said housing permitting fluid communication with said pressure transducer means; a differential transformer disposed within said housing and having a primary winding, an A secondary winding, a B secondary winding, and a movable core arranted to move with the mechanical displacement of said pressure transducer means; signal supply means disposed remote from said housing to supply an AC signal to the primary winding of said differential transformer; and a signal detecting and conditioning circuit disposed remote from said housing and including demodulating means coupled to said A and B secondary windings to produce an X demodulated signal and a Y demodulated signal respectively therefrom, adding means producing a sum signal from said X and Y demodulated signals as a temperature signal, subtracting means producing a difference signal from said X and Y demodulated signals as a pressure signal, and multiplying means producing a temperature-compensated differential pressure signal based on said temperature signal and said pressure signal.

2. A differential pressure detector for sensing the pressure of a fluid at two points, and suitable for use in a hostile environment in which pressures may reach 500 psig and temperatures may reach 500° F., comprising a housing formed of material suitable for withstanding the temperatures and pressures of said hostile environment; pressure bellows enclosed within said housing; first and second ports in said housing for permitting fluid communication of said bellows with said two points so that said bellows moves in relation to the differential pressure therebetween; a differential transformer within said housing and having a primary winding, an A secondary winding, a B secondary winding, and a movable core disposed to move with said bellows; signal supply means disposed remote from said housing to supply an AC signal to the primary winding of said differential transformer; and a signal detecting and conditioning circuit disposed remote from said housing and including demodulating means coupled to said A secondary winding and said B secondary winding to produce an X demodulated signal and a Y demodulated signal respectively therefrom, summing means for providing a sum signal $X+Y$ from said X and Y demodulated signals as a voltage analog of the temperature of said differential transformer, means for deriving a correction signal as a difference value of said sum signal X+Y and a reference voltage Ref, subtracting means for providing a difference signal X−Y from said X and Y demodulated signals as a voltage analog of said differential pressure, multiplying means for multiplying said difference signal X−Y by said correction voltage to produce a resulting temperature-compensated differential-pressure analog signal, and signal conditioning means for converting said temperature-compensated analog signal to an output signal suitable for use with an electrically-driven indicator device.

3. A detector according to claim 1 or 2, wherein said differential transformer primary and secondary windings are wound on a bobbin made of stainless steel.

4. A detector according to claim 1 or 2, wherein said primary and secondary windings are wound of magnet wire coated with polyamide insulation.

5. A detector according to claim 1 or 2, wherein said housing includes an electrical housing portion containing said differential transformer, and further comprising a shroud composed of high-temperature resistant, low thermal conductivity material surrounding, and generally displaced from the surface of said electrical housing portion.

6. A detector according to claim 5, wherein said shroud is formed of stainless steel sheet.

7. A pressure or differential pressure detector for sensing the pressure of a fluid and suitable for use in an environment in which the temperature can vary, comprising a housing formed of material suitable for withstanding conditions of said environment; pressure transducer means disposed within said housing for converting said pressure into a corresponding mechanical displacement; at least one port in said housing permitting fluid communication with said pressure transducer means; a differential transformer disposed within said housing and having a primary winding, an A secondary winding with first and second leads, a B secondary winding with first and second leads, and a movable core arranged to move with the mechanical displacement of said presure transducer means; signal supply means disposed remote from said housing to supply an AC signal to the primary winding of said differential transformer; and a signal detecting and conditioning circuit disposed remote from said housing and including first and second operational amplifiers each having first and second inputs and an output, first, second, and third resistors and first, second, and third diodes, the first resistor being connected between the first lead of a respective one of said secondary windings and the first input of the associated operational amplifier, the first and second diodes being connected back-to-back at one end to said second lead, and at the other end through said second resistor to said second input, and to said first input, respectively, of the associated operational amplifier, and said third resistor and said third diode being coupled in series between said output and said second input of the associated operational amplifier, so that the first and second operational amplifiers provide a temperature stabilized X demodulated signal and a temperature stabilized Y demodulated signal, respectively; means for combining said X and Y demodulated signals to form a sum signal X+Y and a difference signal X−Y as temperature and pressure analogs, respectively; multiplying means for producing a temperature-compensated analog signal in response to said sum and difference signals; and output means providing an output signal, based on said temperature-compensated analog signal, for use with an electrically-driven indicator device.

8. A differential pressure detector for sensing the differential pressure of a fluid between two points comprising a housing; pressure-sensitive bellows means enclosed in said housing; first and second ports in said housing for permitting fluid communication of said bellows means with said two points so that said bellows means moves in relation to said differential pressure; a differential transformer within said housing and having a primary winding, an A secondary winding, a B secondary winding, and a movable core disposed to move with said bellows means; signal supply means disposed remote from said housing to supply an AC signal to the primary winding of said differential transformer; and a signal detecting and conditioning circuit disposed remote from said housing and including demodulating means coupled to said A and B secondary windings to produce an X demodulated signal and a Y demodulated signal respectively therefrom, adding means producing a sum signal from said X and Y demodulated signals as a temperature analog signal, subtracting means producing a difference signal from said X and Y demodulated signals as a differential pressure analog signal, and multiplying means producing a temperature-compensated differential pressure signal based on said temperature analog signal and said differential pressure analog signal; wherein said bellows means includes an expandable longitudinal bellows, a shaft extending axially through said bellows to move therewith, and a helical spring biasing said shaft, said spring being generally cylindrical and having a coil member of generally rectangular cross-section so that the biasing force of said spring can be matched to said longitudinal bellows by machining the outer cylindrical surface of the spring.

9. A differential pressure detector according to claim 8, wherein said spring is formed of a tube of spring metal, with a helical cutout extending through said tube.

10. A differential pressure detector for sensing the differential pressure of a fluid between two points and within a predetermined range comprising a housing; pressure-sensitive bellows means enclosed in said housing; first and second ports in said housing for permitting fluid communication of said bellows with said two points so that said bellows moves in relation to said differential pressure; a differential transformer with said housing and having a primary winding, an A secondary winding, a B secondary winding, and a movable core disposed to move with said bellows; signal supply means remote form said housing to supply an AC signal to the primary winding of said differential transformer; and a signal detecting and conditioning circuit disposed remote from said housing and including demodulating means coupled to said A and B secondary windings to produce an X demodulated signal and a Y demodulated signal respectively therefrom, adding means producing a sum signal from said X and Y demodulated signals as a temperature analog signal, subtracting means producing a difference signal from said X and Y demodulated signals as a differential pressure analog signal, and multiplying means producing a temperature-compensated differential pressure signal based on said temperature analog signal and said differential pressure analog signal; wherein said bellows means includes a longitudinal bellows member expandable in the axial direction thereof and having an outer surface in fluid communication with one of said first and second ports, a shaft connected to one end of said bellows member extending axially through the other end of said bellows member and coupled to the movable core of said differential transformer, upper and lower seal members disposed on said shaft between said bellows member and said differential transformer to permit fluid communication of the other of said first and second ports with an inner surface of said bellows when said differential pressure is within said predetermined range, and a sealing moulding affixed to said shaft between said upper and lower seal members to block said fluid communication between said other port and said inner surface when said differential pressure is above or below said predetermined range.

11. A differential pressure detector according to claim 10, wherein said upper and lower seals each include a frustro-conical surface and an axial fluid passageway radially within said surface, and said sealing moulding includes a disc having upper and lower upstanding sealing ribs for contacting the frustro-conical surface of said upper and lower seals when said differential pressure is above or below said predetermined range.

* * * * *